United States Patent
Weder et al.

(10) Patent No.: US 6,669,620 B2
(45) Date of Patent: Dec. 30, 2003

(54) METHOD AND APPARATUS FOR MAKING CURLED DECORATIVE GRASS

(75) Inventors: Donald E. Weder, Highland, IL (US); William F. Straeter, Breese, IL (US); Joseph G. Straeter, Highland, IL (US); Franklin J. Craig, Valley Park, IL (US); Michael J. King, Staunton, IL (US); Michael R. Klemme, Collinsville, IL (US); Sonny K. Burnside, Wheaton, IL (US)

(73) Assignee: Southpac Trust International, Inc., Highland, IL (US)

(*) Notice: Subject to any disclaimer, the term of this patent is extended or adjusted under 35 U.S.C. 154(b) by 0 days.

(21) Appl. No.: 10/303,595

(22) Filed: Nov. 22, 2002

(65) Prior Publication Data

US 2003/0078150 A1 Apr. 24, 2003

Related U.S. Application Data

(63) Continuation of application No. 09/982,407, filed on Oct. 18, 2001, now abandoned, which is a continuation of application No. 09/591,920, filed on Jun. 12, 2000, now abandoned, which is a continuation of application No. 08/879,242, filed on Jun. 19, 1997, now abandoned.

(51) Int. Cl.[7] .................................................. B31B 1/14
(52) U.S. Cl. ....................................... 493/459; 493/460
(58) Field of Search ........................... 428/7, 402, 352; 493/459, 464, 461, 460, 967; 83/176

(56) References Cited

U.S. PATENT DOCUMENTS

| | | |
|---|---|---|
| 2,016,334 A | 10/1935 | McComb |
| 2,244,845 A | 6/1941 | Matthews |
| 2,336,100 A | 12/1943 | Jacque et al. |
| 2,399,744 A | 5/1946 | Kaphan |
| 2,679,887 A | 7/1949 | Doyle et al. |
| 3,398,434 A | 8/1968 | Alesi, Jr. et al. |
| 3,416,991 A | 12/1968 | Yoshimura |
| 3,459,845 A | 8/1969 | Hebeler |
| 3,558,580 A | 1/1971 | Orser |
| 3,650,877 A | 3/1972 | Johnson |
| 3,673,056 A | 6/1972 | Nadler |
| 3,803,284 A | 4/1974 | Burghardt |
| 3,869,533 A | 3/1975 | Jonocha et al. |
| 3,898,117 A | 8/1975 | Taylor |
| 3,917,498 A | 11/1975 | O'shima |
| 3,933,959 A | 1/1976 | Skochdopole et al. |
| 4,045,949 A | 9/1977 | Paton et al. |
| 4,199,627 A | 4/1980 | Weder et al. |
| 4,255,487 A | 3/1981 | Sanders |
| 4,292,266 A | 9/1981 | Weder et al. |
| 4,401,700 A | 8/1983 | Weder et al. |
| 4,496,614 A | 1/1985 | Weder et al. |
| 4,549,908 A | 10/1985 | Weder et al. |
| 4,735,669 A | 4/1988 | Guida et al. |
| 4,989,396 A | 2/1991 | Weder et al. |
| 5,088,972 A | 2/1992 | Parker |
| 5,173,352 A | 12/1992 | Parker |
| 5,257,492 A | 11/1993 | Watts |

(List continued on next page.)

Primary Examiner—Eugene Kim
Assistant Examiner—R. Kent
(74) Attorney, Agent, or Firm—Dunlap Codding & Rogers, P.C.

(57) ABSTRACT

Curled decorative grass having a variety of configurations and methods for making such decorative grass is provided which, because of its increased bulk, can also be used as a packing material, an animal bedding, cat litter, mulch for soil and a media for plants. The curled decorative grass is produced by curling a substantially flat sheet of material and thereafter cutting the resulting curled sheet of material, or by cutting a pre-curled material.

16 Claims, 7 Drawing Sheets

U.S. PATENT DOCUMENTS

| | | |
|---|---|---|
| 5,403,259 A | 4/1995 | Parker |
| D368,654 S | 4/1996 | Santoiemmo et al. |
| 5,518,492 A | 5/1996 | Goldstein |
| 5,573,491 A | 11/1996 | Parker |
| 5,656,008 A | 8/1997 | Beierlorzer |
| 5,678,388 A | 10/1997 | Weder |
| 5,694,741 A | 12/1997 | Weder et al. |
| 5,711,752 A | 1/1998 | Goldstein |
| 5,712,020 A | 1/1998 | Parker |
| 5,802,813 A | 9/1998 | Weder |
| 5,871,432 A | 2/1999 | Beierlorzer |
| 5,906,280 A | 5/1999 | Weder |
| 5,906,569 A | 5/1999 | Ratzel |
| 5,916,081 A | 6/1999 | Goldstein |
| 5,921,907 A | 7/1999 | Beierlorzer |
| 6,053,323 A | 4/2000 | Weder |
| 6,080,265 A | 6/2000 | Weder |
| 6,221,000 B1 * | 4/2001 | Weder ........................ 493/463 |
| 6,402,675 B2 * | 6/2002 | Weder ........................ 493/463 |
| 6,468,196 B1 * | 10/2002 | Weder ........................ 493/459 |

* cited by examiner

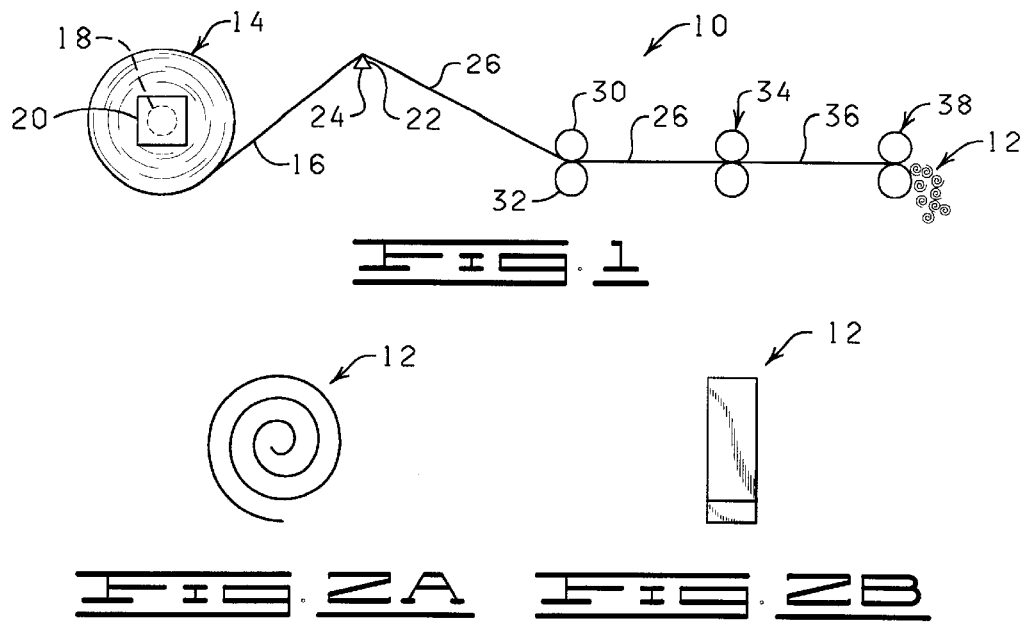
FIG. 1
FIG. 2A  FIG. 2B
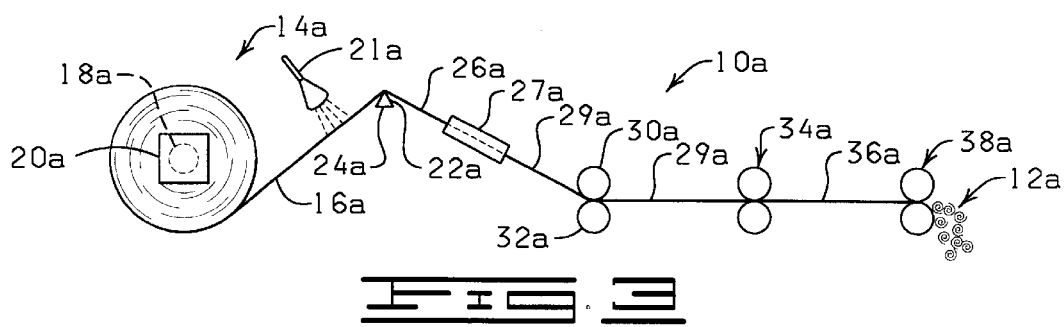
FIG. 3
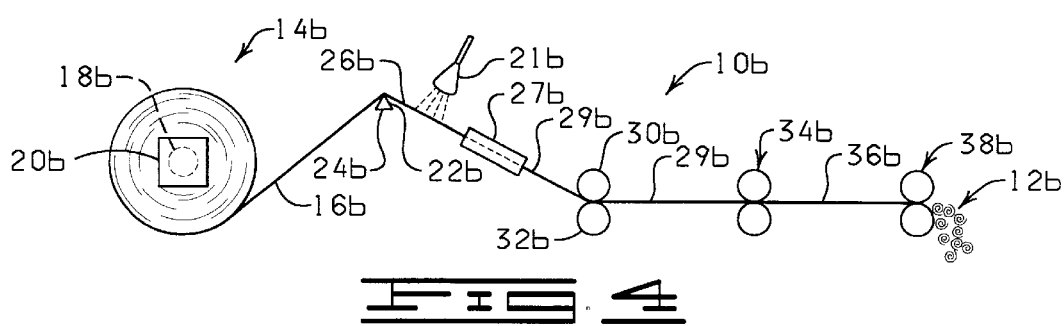
FIG. 4

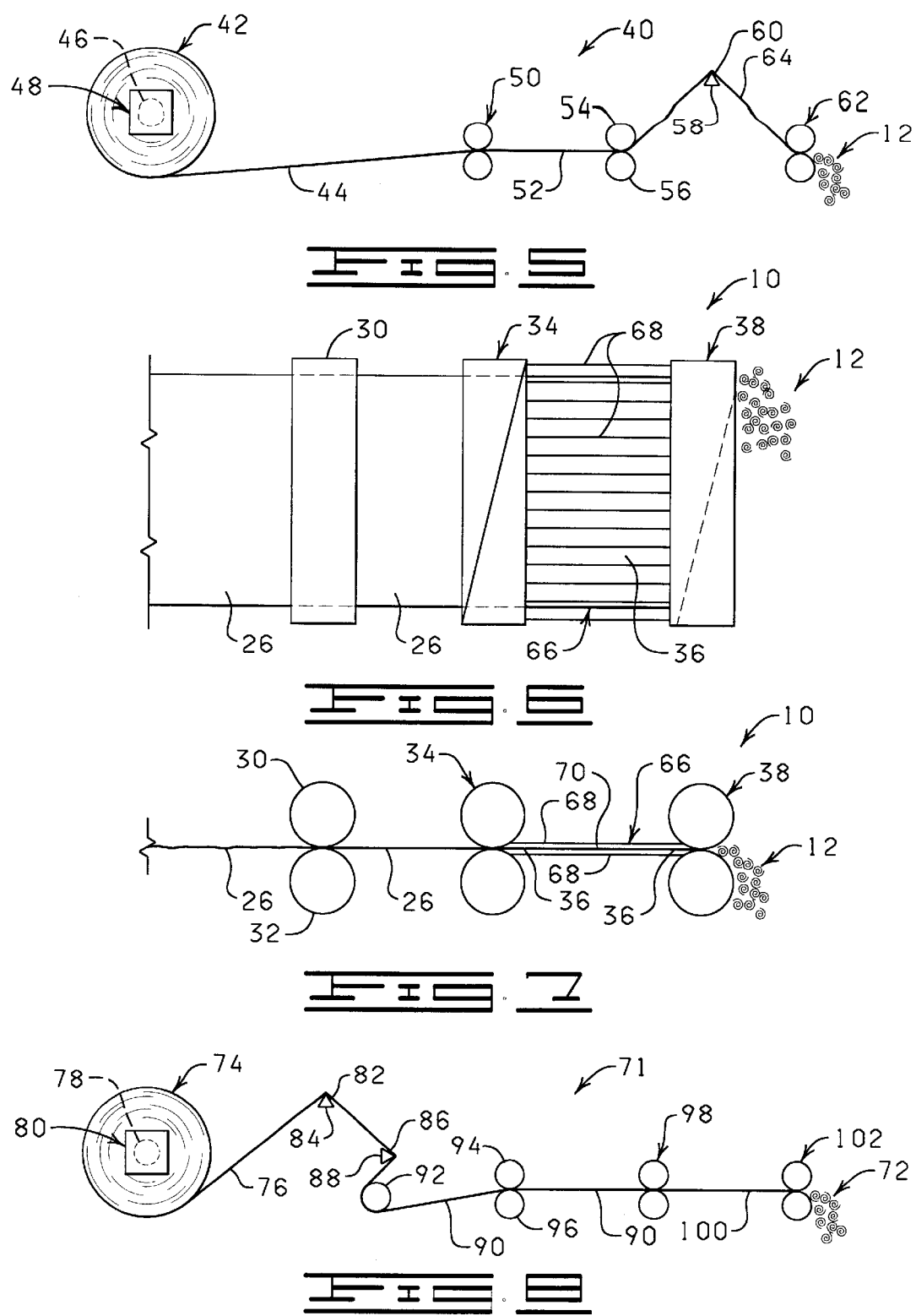

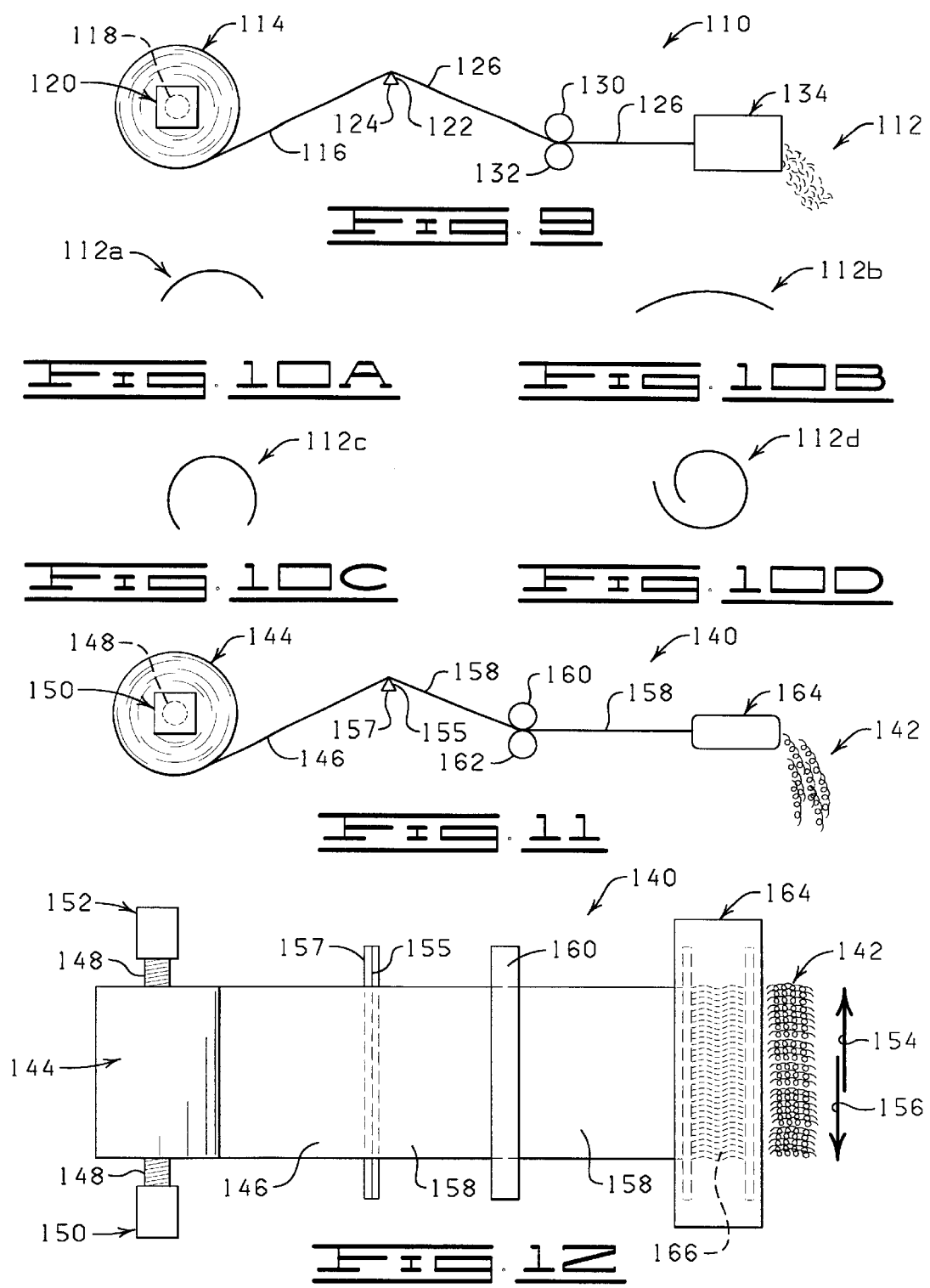

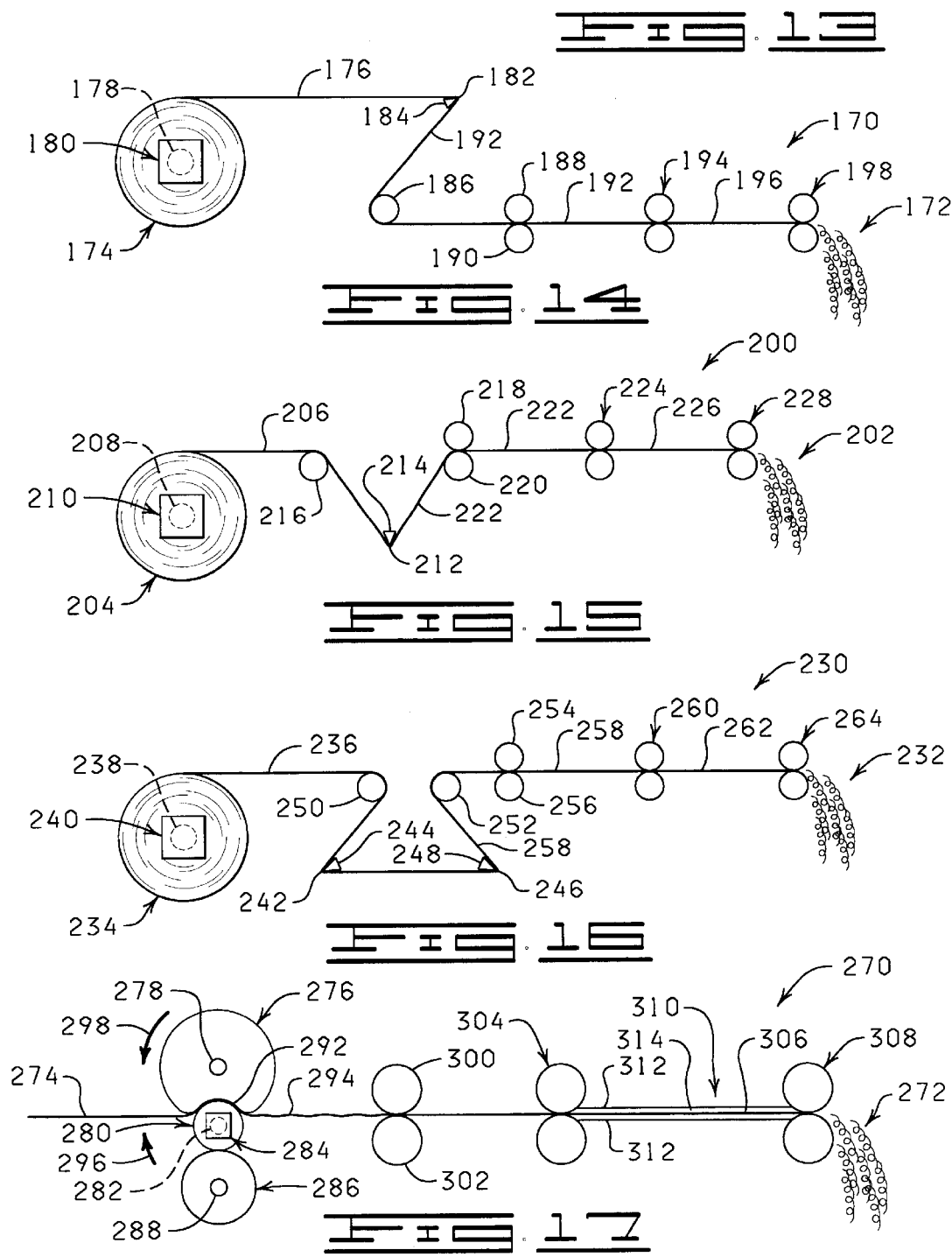

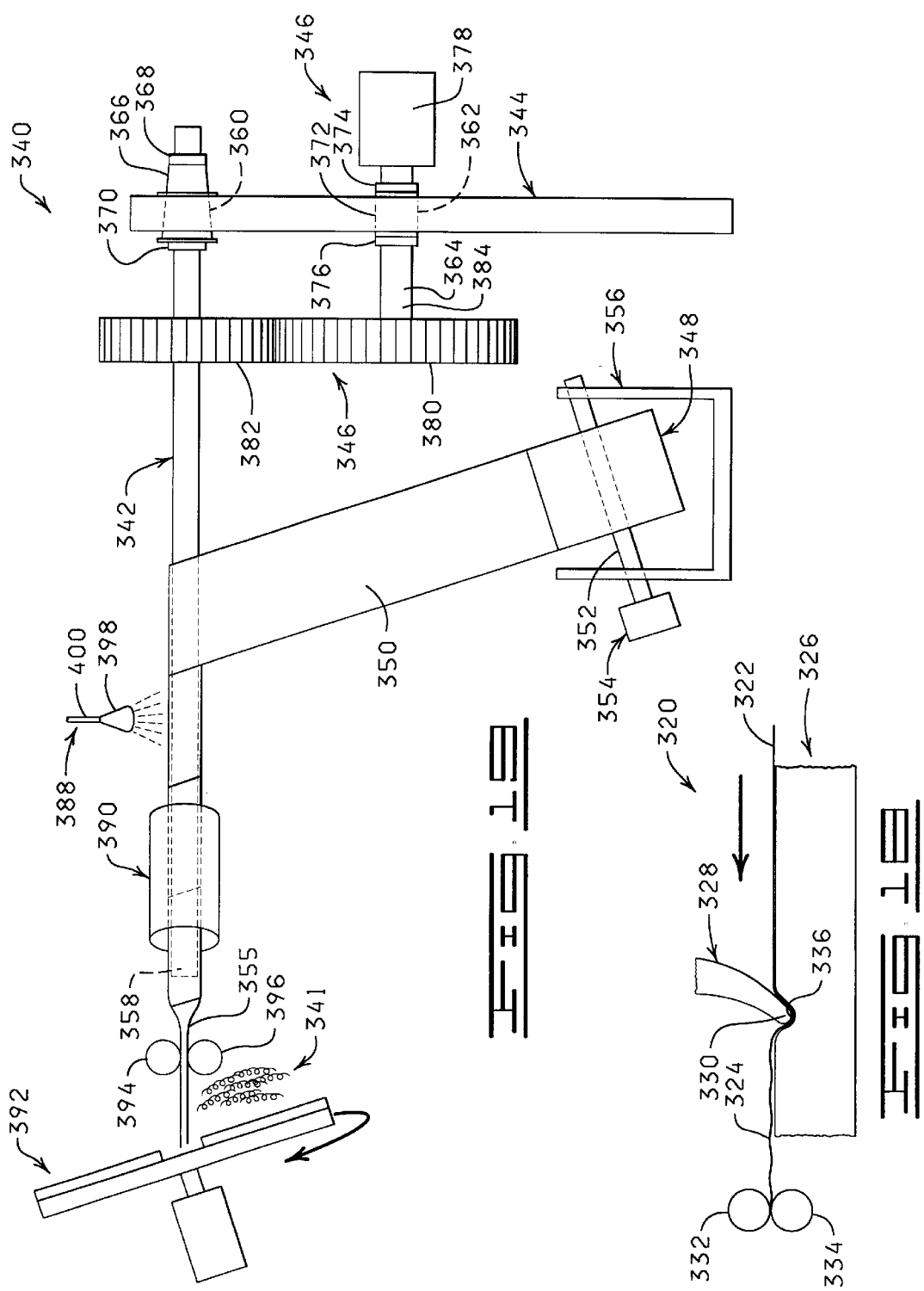

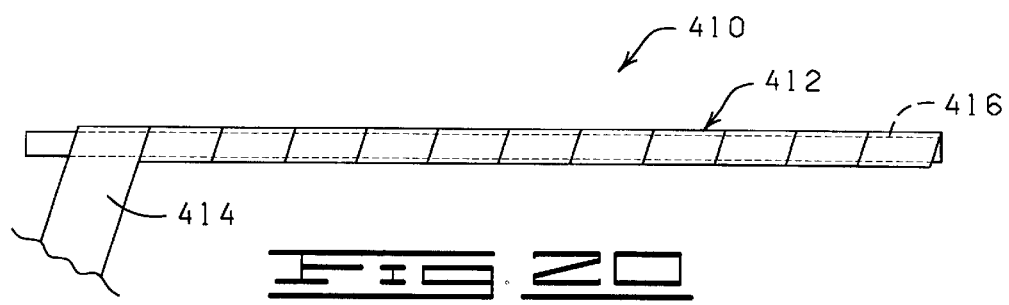
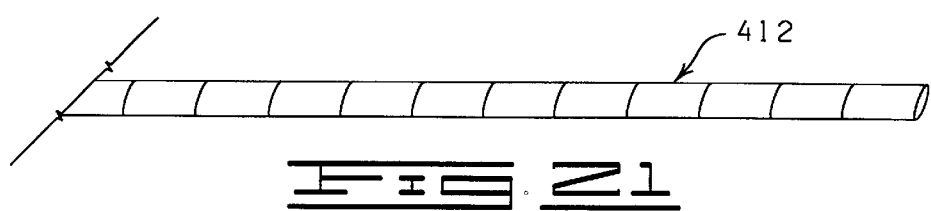
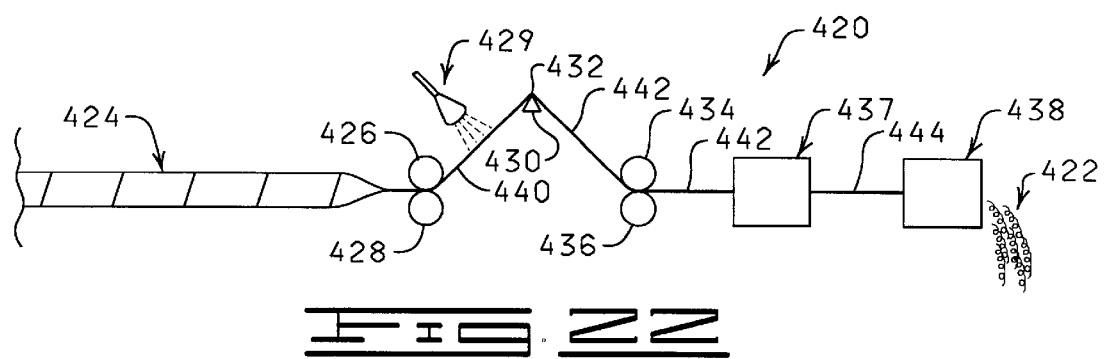
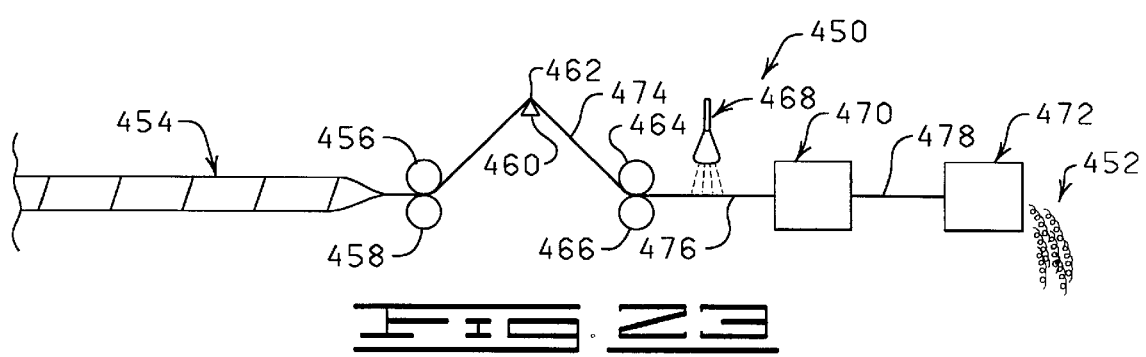

METHOD AND APPARATUS FOR MAKING CURLED DECORATIVE GRASS

CROSS REFERENCE TO RELATED APPLICATIONS

This application is a continuation of U.S. Ser. No. 09/982,407, filed Oct. 18, 2001, now abandoned; which is a continuation of U.S. Ser. No. 09/591,920 filed Jan. 12, 2000, now abandoned; which is a continuation of U.S. Ser. No. 08/879,242, filed Jun. 19, 1997, now abandoned.

STATEMENT REGARDING FEDERALLY SPONSORED RESEARCH OR DEVELOPMENT

Not Applicable.

BACKGROUND OF THE INVENTION

1. Field of the Invention

The present invention relates generally to decorative grass and methods for producing same, and more particularly, but not by way of limitation, to curled decorative grass and methods for producing same.

2. Brief Description of Prior Art

Decorative grass has been used for many years in Easter baskets and for other decorative purposes. The decorative grass of the prior art has been produced by numerous methods and from a variety of materials such as polymeric materials, paper, cellophane or the like. Typically, such materials are cut and shredded to produce segments having predetermined dimensions. One such prior art method for making decorative grass is disclosed in U.S. Pat. No. 4,292,266, issued to Weder, et al., wherein a plastic film is extruded and cut into plastic strips which are passed through a slow-speed godet, an oven and a high-speed godet so that the strips are drawn down in width and thickness without breaking. From the high-speed godet, the strips or strands are chopped to a desired length and conveyed to a storage area for subsequent bagging and packaging.

While the prior art methods for making decorative grass have been widely accepted, new and improved methods for making decorative grasses having improved aesthetic qualities and bulk are being sought which are less costly. It is to such decorative grasses and methods for producing same that the present invention is directed.

SUMMARY OF THE INVENTION

The present invention relates to curled decorative grass having a variety of configurations and to methods for making such decorative grass. Because of the increased bulk of the curled decorative grass of the present invention, such decorative grass can also be used as a packing material, an animal bedding, cat litter, mulch for soil and a media for plants. The curled decorative grass is produced by curling a substantially flat sheet of material and thereafter cutting the resulting curled sheet of material.

In one embodiment of the present invention, curled decorative grass having a multi-sided cross configuration, a length, a width and a substantially clock spring configuration is produced by drawing a substantially flat sheet or web of material over at least one curl bar so as to impart a curl to the sheet or web of material, slitting the curled sheet or web of material to provide a web of material containing a plurality of curled strips, and thereafter cutting the web of material containing the curled strips into segments to produce decorative grass having a substantially clock spring configuration.

In another embodiment of the present invention, decorative grass having a substantially compression-tension spring or pasta configuration is produced by providing a sheet or web of material, curling the sheet or web of material to provide a curled sheet or web of material, oscillating the curled sheet or web of material in a lateral direction while slitting the sheet or web of material into a slit web of material containing a plurality of curled strips having a multi-sided cross section, a length and a width. The curled sheet of material can be slit in the direction of travel of the curled sheet or web of material, or the curled sheet of material can be slit in a direction substantially perpendicular to the direction of travel of the curled sheet or web of material. When slitting the curled sheet or web of material in the direction of travel of the curled sheet or web of material (i.e., machine direction), the curled slit sheet or web of material is cut in a direction perpendicular or oblique to the direction of travel of the slit sheet or web of material.

In yet another embodiment of the present invention, curled decorative grass is produced from a sheet of pre-curled material which is thereafter cut to provide curled decorative grass having increased bulk.

An object of the present invention is to provide a decorative grass having improved aesthetic qualities.

Another object of the present invention, while achieving the before-stated object, is to provide a method for producing a decorative grass having improved aesthetic qualities and bulk which is cost effective.

Yet another object of the present invention while achieving the before-stated objects, is to provide curled decorative grass having a variety of configurations.

Other objects, features and advantages of the present invention will become apparent from the following detailed description when read in conjunction with the accompanying drawings and appended claims.

BRIEF DESCRIPTION OF THE DRAWINGS

FIG. 1 is a schematic representation of a system for making curled decorative grass having a clock spring configuration in accordance with the present invention.

FIG. 2A is a top plan view of a segment of curled decorative grass having a clock spring configuration.

FIG. 2B is a side view of the curled decorative grass of FIG. 2A.

FIG. 3 is a schematic representation of another system for making curled decorative grass having a clock spring configuration in accordance with the present invention.

FIG. 4 is a schematic representation of another system for making curled decorative grass having a clock spring configuration in accordance with the present invention.

FIG. 5 is a schematic representation of another system for making curled decorative grass having a clock spring configuration in accordance with the present invention.

FIG. 6 is a fragmental top plan view of a retaining assembly for maintaining a slit web of curled material in a substantially planar condition between a knife assembly for slitting the curled web of material and a cutting assembly for cutting the curled web of material into curled segments of decorative grass.

FIG. 7 is a side elevational view of the restraining assembly of FIG. 6.

FIG. 8 is a schematic representation of a system for making curled decorative grass having a curl along the length and across the width thereof.

FIG. 9 is a schematic representation of a system for making curled decorative grass having a semi-straw configuration in accordance with the present invention.

FIGS. 10A–10D are end views of a decorative grass having a semi-straw configurations.

FIG. 11 is a schematic representation of a system for making curled decorative grass having a compression-tension spring or pasta curl configuration in accordance with the present invention.

FIG. 12 is a top plan view of the system of FIG. 11 for making curled decorative grass having a compression-tension spring or pasta curl configuration.

FIG. 13 is a pictorial representation of decorative grass having a compression-tension spring or pasta curl configuration.

FIG. 14 is a schematic representation of another system for making curled decorative grass in accordance with the present invention.

FIG. 15 is a schematic representation of yet another system for making curled decorative grass in accordance with the present invention.

FIG. 16 is a schematic representation of still another system for making curled decorative grass in accordance with the present invention.

FIG. 17 is a schematic representation of a system for making curled decorative grass in accordance with the present invention having a restraining assembly disposed between the device for slitting the curled web of material and the cutting device for cutting the slit web to produce curled decorative grass in accordance with the present invention.

FIG. 18 is a fragmental, schematic representation of another system for making curled decorative grass in accordance with the present invention.

FIG. 19 is a schematic representation of a system for making a pre-curled material which, upon cutting into segments, provides curled decorative grass in accordance with the present invention.

FIG. 20 is a schematic representation of another system for making a pre-curled material which, upon cutting into segments, provides curled decorative grass in accordance with the present invention.

FIG. 21 is a perspective view of the pre-curled material of FIG. 20.

FIG. 22 is a schematic representation of a system for making curled decorative grass utilizing a pre-curled material.

FIG. 23 is a schematic representation of another system for making curled decorative grass utilizing a pre-curled material.

DETAILED DESCRIPTION

Figure 24:
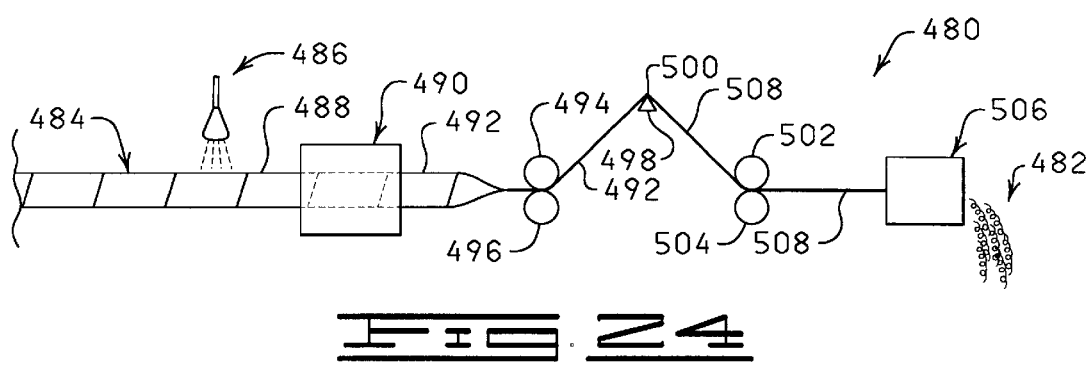
FIG. 24 is a schematic representation of yet another system for making curled decorative grass utilizing a pre-curled material.

Referring now to the drawings, FIG. 1 illustrates schematically a system 10 for making curled decorative grass 12 in accordance with the present invention. The curled decorative grass 12 has a clock spring configuration which provides the curled decorative grass 12 with improved bulk. Thus, the curled decorative grass 12 is especially suited for use in Easter baskets, or as packing material, animal bedding, cat litter, mulch for soil and media for plants.

The system 10 includes a roll of material 14 which consists of a substantially flat sheet or web of material 16 capable of having a curl imparted thereto. The roll of material 14 is supported on a mandrel 18 having a brake assembly 20 operably connected thereto so that the sheet or web of material 16 can be controllably withdrawn from the roll of material 14. The sheet or web of material 16 withdrawn from the roll of material 14 is drawn over a curling edge 22 of a curl bar 24 so as to provide a curled sheet or web of material 26. The curling edge 22 of the curl bar 24 is angularly disposed relative to the travel path of the sheet or web of material 16 so that as the sheet or web of material 16 is drawn over the curling edge 22 of the curl bar 24, the curled sheet or web of material 26 is produced.

The angular disposition of the curling edge 22 of the curl bar 24 relative to the sheet or web of material 16 can vary widely and will be dependent to a large degree on the amount and type of curl to be imparted to the sheet or web of material 16, as well as to the curling properties of the sheet or web of material 16. Generally, however, the curling edge 22 of the curl bar 24 will be disposed at an angle of from about 15 degrees to about 180 degrees relative to the sheet or web of material 16.

To maintain the desired tension on the sheet or web of material 16 as the sheet or web of material 16 is drawn over the curling edge 22 of the curl bar 24, the system 10 further includes a pair of tension or nip rollers 30 and 32 positioned downstream of the curl bar 24 to ensure proper angular disposition of the sheet or web of material 16 as the sheet or web of material 16 is drawn over the curling edge 22 of the curl bar 24. The curled sheet or web of material 26, upon passage through the tension rollers 30 and 32, is fed into a slitter or shredder 34 where the curled sheet or web of material 26 is slit to provide a slit sheet or web of material 36 having a plurality of curled strips of predetermined width.

The slitting of the curled sheet or web of material 26 to produce the slit sheet or web of material 36 having a plurality of curled strips of predetermined width can be accomplished using any well known method and device. Such common methods of slitting the curled sheet or web of material 26 include: (a) slitting the curled sheet or web of material 26 to produce side-by-side strips of material wherein the longer dimension of the strips is in the direction of travel of the curled sheet or web of material 26, i.e. the machine direction; or (b) slitting the curled sheet or web of material 26 so that the longer dimension of the strips of material are oblique to the direction of travel of the curled sheet or web of material 26, i.e. obliquely to the machine direction.

The slit sheet or web of material 36 is then passed through a cutting unit 38 where the curled strips of the slit sheet or web of material 36 are cut to form the curled decorative grass 12 having a clock spring configuration substantially as shown in FIGS. 2A and 2B. Any conventional device and method can be employed to cut the slit sheet or web of material 36 to form the curled decorative grass 12. Examples of such conventional devices and methods which can be employed to cut the slit sheet or web of material 36 are rotary knives, reciprocating knives, die cutting, laser cutting, water jet cutting, air jet cutting and the like.

The curled decorative grass 12 produced by cutting the slit sheet or web of material 36 can then be conveyed to a storage area (not shown) which may be in the form of a suitable bin, or the curled decorative grass 12 may be conveyed to a packaging machine, or the curled decorative grass 12 may be conveyed to a baling machine for baling prior to storage. As other alternatives, the curled decorative grass 12 may be placed into boxes or cartons, subjected to further processing immediately or held for subsequent processing.

Any material capable of having a curl imparted thereto can be employed as the sheet or web of material 16. However, desirable results can be achieved wherein the sheet or web of material 16 is paper, creped paper, polymeric film, laminated polymeric film, wax paper, paper having a shape sustaining agent applied to at least one side and paper having a lacquer applied to at least one side. The sheet or web of material 16 may have a printed pattern and/or an embossed pattern on at least one surface thereof, and the embossed pattern can be either in register or out of register with the printed pattern.

The printed pattern can be printed on the sheet or web of material 16 in a conventional manner so that, when the sheet or web of material 16 is slit and cut to produce the curled decorative grass 12, at least a substantial portion of the curled decorative grass 12 contains at least a portion of the printed pattern. Further, different colors can be employed to provide the printed pattern on the sheet or web of material 16.

The sheet or web of material 16 can also be embossed so as to provide the sheet or web of material 16 with an embossed pattern. The embossed pattern can be provided on the sheet or web of material 16 so that when the sheet or web of material 16 is slit and cut to produce the curled decorative grass 12, at least a substantial portion of the curled decorative grass contains at least a portion of the embossed pattern. Further, the sheet or web of material 16 can be provided with an embossed pattern as well as a printed pattern and the embossed pattern can be either in register or out of register with the printed material and/or printed design. The printed pattern and embossed pattern can be provided on the sheet or web of material 16 so that when the sheet or web of material 16 is slit and cut to produce the curled decorative grass 12, at least a substantial portion of the curled decorative grass contains at least a portion of the printed pattern and at least a portion of the embossed pattern.

FIG. 3 illustrates schematically a system 10a for making curled decorative grass 12a in accordance with the present invention. The system 10a is similar to the system 10 herein before described except for the application of a shape sustaining or stiffening agent to a sheet or web of material and the drying of the sheet or web of material wetted with the shape sustaining or stiffening agent.

The system 10a includes a roll of material 14a which consists of a substantially flat sheet or web of material 16a capable of having a curl imparted thereto. The roll of material 14a is supported on a mandrel 18a having a brake assembly 20a operably connected thereto so that the sheet or web of material 16a can be controllably withdrawn from the roll of material 14a. An effective amount of a shape sustaining or stiffening agent is applied to the sheet or web of material 16a to effectively wet the sheet or web of material 16a by a spray assembly 21a. The sheet of material 16a wetted with the shape sustaining or stiffening agent is then drawn over a curling edge 22a of a curl bar 24a so as to provide a curled sheet or web of material 26a.

Any liquid composition containing a stiffening or shape sustaining agent which is compatible with the sheet or web of material 16a can be employed. Examples of liquid compositions containing a stiffening or shape sustaining agent which may be used in the practice of the present invention are aqueous starch solutions, aqueous sugar solutions, lacquers, glues and mixtures thereof and liquid, sprayable admixtures containing water-proofing agents such as silicon-based polymers, latex-based polymers, acrylic polymers, fluorocarbons and mixtures thereof.

The curled sheet or web of material 26a wetted with the stiffening or shape sustaining agent is then passed through a drier 27a to provide a dried curled sheet or web of material 29a coated with a stiffening or shape sustaining agent. To maintain the desired tension on the sheet or web of material 16a as the sheet or web of material 16a wetted with the stiffening or shape sustaining agent is drawn over the curling edge 22a of the curl bar 24a, the system 10a further includes a pair of tension or nip rollers 30a and 32a positioned downstream of the curl bar 24a and the drier 27a to ensure proper angular disposition of the sheet or web of material 16a as the sheet or web of material 16a is drawn over the curling edge 22a of the curl bar 24a and through the drier 27a. The dried curled sheet or web of material 29a, upon passage through the tension rollers 30a and 32a, is fed into a slitter or shredder 34a where the dried curled sheet or web of material 29a is slit to provide a slit sheet or web of material 36a having a plurality of curled strips of predetermined width.

The slitting of the dried curled sheet or web of material 29a to produce the slit sheet or web of material 36a having a plurality of curled strips of predetermined width can be accomplished using the methods and devices herein before described with reference to FIG. 1. The slit sheet or web of material 36a is then passed through a cutting unit 38a where the curled strips of the slit sheet or web of material 36a are cut to form the curled decorative grass 12a.

Any material capable of having a curl imparted thereto can be employed as the sheet or web of material 16a. However, desirable results can be achieved wherein the sheet or web of material 16a is paper, creped paper, polymeric film, laminated polymeric film, and paper having a lacquer applied to at least one side. The sheet or web of material 16a may have a printed pattern and/or an embossed pattern on at least one surface thereof, and the embossed pattern can be either in register or out of register with the printed pattern.

FIG. 4 illustrates schematically a system 10b for making curled decorative grass 12b in accordance with the present invention. The system 10b is similar to the system 10 herein before described except for the application of a shape sustaining or stiffening agent to a curled sheet or web of material and the drying of the curled sheet or web of material wetted with the shape sustaining or stiffening agent.

The system 10b includes a roll of material 14b which consists of a substantially flat sheet or web of material 16b capable of having a curl imparted thereto. The roll of material 14b is supported on a mandrel 18b having a brake assembly 20b operably connected thereto so that the sheet or web of material 16b can be controllably withdrawn from the roll of material 14b. The sheet or web of material 16b withdrawn from the roll of material 14b is drawn over a curling edge 22b of a curl bar 24b so as to provide a curled sheet or web of material 26b. The curling edge 22b of the curl bar 24b is angularly disposed relative to the travel path of the sheet or web of material 16b so that as the sheet or web of material 16b is drawn over the curling edge 22b of the curl bar 24b, the curled sheet or web of material 26b is produced.

An effective amount of a shape sustaining or stiffening agent is applied to the curled sheet or web of material 26b to effectively wet the curled sheet or web of material 26b by a spray assembly 21b. The curled sheet of material 26b wetted with the shape sustaining or stiffening agent is then passed through a drier 27b to provide a dried curled sheet or web of material 29b coated with a stiffening or shape sustaining agent.

Any liquid composition containing a stiffening or shape sustaining agent which is compatible with the sheet or web of material 16b can be employed. Examples of liquid compositions containing a stiffening or shape sustaining agent which may be used in the practice of the present invention are aqueous starch solutions, aqueous sugar solutions, lacquers, glues and mixtures thereof and liquid, sprayable admixtures containing water-proofing agents such as silicon-based polymers, latex-based polymers, acrylic polymers, fluorocarbons and mixtures thereof.

To maintain the desired tension on the sheet or web of material 16b as the sheet or web of material 16b is drawn over the curling edge 22b of the curl bar 24b, the system 10b further includes a pair of tension or nip rollers 30b and 32b positioned downstream of the curl bar 24b and the drier 27b to ensure proper angular disposition of the sheet or web of material 16b as the sheet or web of material 16b is drawn over the curling edge 22b of the curl bar 24b. The dried curled sheet or web of material 29b, upon passage through the tension rollers 30b and 32b, is fed into a slitter or shredder 34b where the dried curled sheet or web of material 29b is slit to provide a slit sheet or web of material 36b having a plurality of curled strips of predetermined width.

The slitting of the curled sheet or web of material 29b to produce the slit sheet or web of material 36b having a plurality of curled strips of predetermined width can be accomplished using the methods and devices herein before described with reference to FIG. 1. The slit sheet or web of material 36b is then passed through a cutting unit 38b where the curled strips of the slit sheet or web of material 36b are cut to form the curled decorative grass 12b.

Any material capable of having a curl imparted thereto can be employed as the sheet or web of material 16b. However, desirable results can be achieved wherein the sheet or web of material 16b is paper, creped paper, polymeric film, laminated polymeric film, and paper having a lacquer applied to at least one side. The sheet or web of material 16b may have a printed pattern and/or an embossed pattern on at least one surface thereof, and the embossed pattern can be either in register or out of register with the printed pattern.

FIG. 5 illustrates schematically another system 40 for making the decorative grass 12 having a clock spring configuration substantially as shown in FIGS. 2A and 2B. The system 40 includes a roll of material 42 which consists of a substantially flat sheet or web of material 44 capable of having a curl imparted thereto. The roll of material 42 is supported on a mandrel 46 having a brake assembly 48 operably connected thereto so that the sheet or web of material 44 can be controllably withdrawn from the roll of material 42. The sheet or web of material 44 withdrawn from the roll of material 42 is fed into a slitter or shredder 50 where the sheet or web of material 44 is slit to provide a slit sheet or web of material 52 having a plurality of curled strips of predetermined width.

The system 40 further includes a pair of tension or nip rollers 54 and 56, a curl bar 58 having a curling edge 60 and a cutting unit 62. The nip or tension rollers 54, 56 are positioned upstream of the curl bar 58 and cooperates with the cutting unit 62 to ensure proper angular disposition of the slit sheet or web of material 52, as well as the desired amount of tension on the slit sheet or web of material 52, as the slit sheet or web of material 52 is drawn over the curling edge 60 of the curl bar 58 to provide a curled slit sheet or web of material 64.

The angular disposition of the curling edge 60 of the curl bar 58 relative to the slit sheet or web of material 52 can vary widely and will be dependent to a large degree on the amount and type of curl to be imparted to the slit sheet or web of material 52, as well as to the curling properties of the sheet or web of material 44. Generally, however, the curling edge 60 of the curl bar 58 will be disposed at an angle of from about 15 degrees to about 180 degrees relative to a slit sheet or web of material 52.

The curled slit sheet or web of material 64, after passage over the curling edge 60 of the curl bar 58, is fed into the cutting unit 62 where the curled slit sheet or web of material 64 is cut to form the curled decorative grass 12 having a clock spring configuration substantially as shown in FIGS. 2A and 2B.

The slitting of the sheet or web of material 44 to produce the slit sheet or web of material 52 can be accomplished using any well known method and device. Such common methods of slitting a sheet or web of material include: (a) slitting the sheet or web of material 44 to produce side-by-side strips of material wherein the longer dimension of the strips is in the direction of travel of the sheet or web of material 44, i.e. the machine direction; or (b) slitting the sheet or web of material 44 so that the longer dimension of the strips of material are oblique to the direction of travel of the sheet or web of material 44, i.e. obliquely to the machine direction.

The cutting of the curled slit sheet or web of material 64 to form the curled decorative grass 12 can also be accomplished using any well known method and device. Examples of such conventional devices which can be used as the cutting unit 62 and methods which can be employed to cut the curled slit sheet or web of material 64 to form the curled decorative grass 12 having a clock spring configuration are rotary knives, reciprocating knives, die cutting, laser cutting, water jet cutting, air jet cutting and the like.

Referring now to FIGS. 6 and 7, to enhance the uniformity of the curled decorative grass 12 produced utilizing the system 10 of FIG. 1, it may be desirable to pass the slit sheet or web of curled material 36 through a restraining assembly 66 disposed between the slitter 34 and the cutting unit 38 so as to maintain the slit sheet or web of curled material 36 in a substantially planar or flattened condition prior to cutting the slit sheet or web of curled material 36 with the cutting unit 38 to form the curled decorative grass 12. Any suitable apparatus can be employed as the restraining assembly 66, such as a plurality of spatially disposed guide wires 68 which extend between the slitter 34 and the cutting unit 38 so as to define a passageway 70 through which the slit sheet or web of material 36 is drawn or fed through for entry into and passage through the cutting unit 38.

FIG. 8 illustrates schematically a system 71 for making a curled decorative grass 72 having a curl imparted along its length and a curl imparted across it width in accordance with the present invention. The system 71 includes a roll of material 74 which consists of a substantially flat sheet or web of material 76 capable of having a curl imparted thereto. The roll of material 74 is supported on a mandrel 78 having a brake assembly 80 operably connected thereto so that the sheet or web of material 76 can be controllably withdrawn from the roll of material 74. The sheet or web of material 76 withdrawn from the roll of material 74 is drawn over a curling edge 82 of a first curl bar 84 and then over a curling edge 86 of an oscillating second curl bar 88 which is oscillated in a lateral direction relative to the direction of travel of the sheet or web of material 76. The curling edge 82 of the first curl bar 84 is oriented substantially perpendicular to the direction of travel of the sheet or web of material 76, i.e. perpendicular to the machine direction; and the curling edge 86 of the oscillating second curl bar 88 is disposed in the direction of travel of the sheet or web of material 76, i.e. in the machine direction. Upon drawing the sheet or web of material 76 over the curling edge 82 of the first curl bar 84 and the curling edge 86 of the oscillating second curl bar 88, a curled sheet or web of material 90 is formed having curl in the machine direction and curl in a direction substantially perpendicular to the machine direction. Thus, when the curled sheet or web of material 90 is slit and cut to produce the curled decorative grass 72 in the manner herein after described, the curled decorative grass 72 is provided with a curl along its length and a curl across its width.

To maintain the desired tension on the sheet or web of material 76 as the sheet or web of material 76 is drawn over the curling edge 82 of the first curl bar 84 and the curling edge 86 of the oscillating second curl bar 88, the system 71 further includes a guide roller 92 and a pair of tension or nip rollers 94 and 96 positioned downstream of the oscillating second curl bar 88 to ensure proper angular disposition of the sheet or web of material 76 as the sheet or web of material 76 is drawn over the curling edges 82 and 86 of the first curl bar 84 and the second oscillating curl bar 88, respectively. The curled sheet or web of material 90, upon passage through the tension rollers 94 and 96, is fed into a slitter or shredder 98 where the curled sheet or web of material 90 is slit to provide a slit sheet or web of material 100 having a plurality of curled strips of predetermined width.

The slitting of the curled sheet or web of material 90 to produce the slit sheet or web of material 100 having a plurality of curled strips of predetermined width can be accomplished using any well known method and device. Such common methods of slitting the curled sheet or web of material 90 include slitting the curled sheet or web of material 90 to produce side-by-side strips of material wherein the longer dimension of the strips is in the direction of travel of the curled sheet or web of material 90, i.e. the machine direction; or slitting the curled sheet or web of material 90 so that the longer dimension of the strips of material are oblique to the direction of travel of the curled sheet or web of material 90, i.e. oblique to the machine direction.

The slit sheet or web of material 100 is then passed through a cutting unit 102 where the curled strips are cut to form curled decorative grass 72 having a curl imparted along the length and across the width thereof. Any conventional device and method can be employed to cut the slit sheet or web of material 100 to form the curled decorative grass 72. Examples of such conventional devices and methods which can be employed to cut the slit sheet or web of material 100 are rotary knives, reciprocating knives, die cutting, laser cutting, water jet cutting, air jet cutting and the like.

Any material capable of having a curl imparted thereto can be employed as the sheet or web of material 76. However, desirable results can be achieved wherein the sheet or web of material 76 is paper, creped paper, polymeric film, laminated polymeric film, wax paper, paper having a shape sustaining agent applied to at least one side and paper having a lacquer applied to at least one side. Further, the sheet or web of material 76 may have a printed pattern and/or an embossed pattern on at least one surface thereof, and the embossed pattern can be either in register or out of register with the printed pattern.

FIG. 9 illustrate schematically a system 110 for making curled decorative grass 112 having a semi-straw configuration. The system 110 includes a roll of material 114 which consists of a substantially flat sheet or web of material 116 capable of having a curl imparted thereto. The roll of material 114 is supported on a mandrel 118 having a brake assembly 120 operably connected thereto so that the sheet or web of material 116 can be controllably withdrawn from the roll of material 114. The sheet or web of material 116 withdrawn from the roll of material 114 is drawn over a curling edge 122 of a curl bar 124 so as to provide a curled sheet or web of material 126. The curling edge 122 of the curl bar 124 is angularly disposed relative to the travel path of the sheet or web of material 116 so that as the sheet or web of material 116 is drawn over the curling edge 122 of the curl bar 124, the curled sheet or web of material 126 is produced.

The angular disposition of the curling edge 122 of the curl bar 124 relative to the sheet or web of material 116 can vary widely and will be dependent to a large degree on the amount and type of curl to be imparted to the sheet or web of material 116, as well as to the curling properties of the sheet or web of material 116. Generally, however, the curling edge 122 of the curl bar 124 will be disposed at an angle of from about 15 degrees to about 180 degrees relative to the sheet or web of material 116.

To maintain the desired tension on the sheet or web of material 116 as the sheet or web of material 116 is drawn over the curling edge 122 of the curl bar 124, the system 110 further includes a pair of tension or nip rollers 130 and 132 positioned downstream of the curl bar 124 to ensure proper angular disposition of the sheet or web of material 116 as the sheet or web of material 116 is drawn over the curling edge 122 of the curl bar 124. The curled sheet or web of material 126, upon passage through the tension rollers 130 and 132, is fed into a slitter or shredder 134 where the curled sheet or web of material 126 is slit either substantially perpendicular or obliquely to the direction of travel of the curled sheet or web of material 126 to provide curled decorative grass 112a–112d having a semi-straw configuration substantially as shown in FIGS. 10A–10D.

Any material capable of having a curl imparted thereto can be employed as the sheet or web of material 116. However, desirable results can be achieved wherein the sheet or web of material 116 is paper, creped paper, polymeric film, laminated polymeric film, wax paper, paper having a shape sustaining agent applied to at least one side and paper having a lacquer applied to at least one side. The sheet or web of material 116 may have a printed pattern and/or an embossed pattern on at least one surface thereof, and the embossed pattern can be either in register or out of register with the printed pattern. Further, different colors can be employed to provide the printed pattern on the sheet or web of material 116.

FIGS. 11 and 12 illustrate schematically a system 140 for making a decorative grass 142 having a compression-tension spring or pasta configuration substantially as shown in FIG. 13. The system 140 includes a roll of material 144 which consists of a substantially flat sheet or web of material 146 capable of having a curl imparted thereto. The roll of material 144 is supported on a mandrel 148 having a brake assembly 150 operably connected thereto so that the sheet or web of material 146 can be controllably withdrawn from the roll of material 144. An oscillating assembly 152 (FIG. 12) is also connected to the mandrel 148 so that the roll of material 144, and thus the sheet or web of material 146 controllably withdrawn from the roll of material 144 can be laterally oscillated relative to the direction of travel of the sheet or web of material 146 (i.e., oscillated in the directions indicated by arrows 154 and 156 of FIG. 12). Brake assemblies for controlling the rate of withdrawal of the sheet or web of material 146 from the roll of material 144 and oscillating assemblies for laterally oscillating the roll of material 144 so that the sheet or web of material 146 withdrawn therefrom is oscillated in a lateral direction are well known in the art. Thus, no further comments or description of the brake assembly 150 or the oscillating assembly 152 are believed necessary to enable one skilled in the art to understand and practice the inventive concepts disclosed herein.

The sheet or web of material 146 withdrawn from the roll of material 144 is drawn over a curling edge 155 of a curl bar 157 so as to provide a curled sheet or web of material 158. The curling edge 155 of the curl bar 157 is angularly disposed relative to the travel path of the sheet or web of material 146 so that as the sheet or web of material 146 is drawn over the curling edge 155 of the curl bar 157, a desired curl is imparted to the sheet or web of material 146.

The angular disposition of the curling edge 155 of the curl bar 157 relative to the sheet or web of material 146 can vary widely and will be dependent to a large degree on the amount and type of curl to be imparted to the sheet or web of material 146, as well as to the curling properties of the sheet or web of material 146. Generally, however, the curling edge 155 of the curl bar 157 will be disposed at an angle of from about 15 degrees to about 180 degrees relative to the sheet or web of material 146.

To maintain the desired tension on the sheet or web of material 146 as the sheet or web of material 146 is drawn over the curling edge 155 of the curl bar 157, the system 140 further includes a pair of tension or nip rollers 160 and 162 positioned downstream of the curl bar 157 to ensure proper angular disposition of the sheet or web of material 146 as the sheet or web of material 146 is drawn over the curling edge 155 of the curl bar 157 to provide a curled sheet or web of material 158. The curled sheet or web of material 158, upon passage through the tension rollers 160 and 162, is then fed into a slitter and shredding unit 164 where the curled sheet or web of material 158 is slit to provide a slit sheet or web of material 166 (FIG. 12) and thereafter the slit sheet or web of material 166 is shredded or cut into the decorative grass 142 having a compression-tension spring or pasta configuration.

The slitting of the curled slit sheet-or web of material 158 to provide the slit sheet or web of material 166, and the shredding or cutting of the slit sheet or web of material 166 into the decorative grass 142 can be accomplished using any well known method and devices such as rotary knives, reciprocating knives, die cutting, laser cutting, water jet cutting, air jet cutting and the like.

The curl bar 157, the tension rollers 160 and 162 and the slitter and shredding unit 164 are each provided with a width greater than the width of the sheet or web of material 146 so as to accommodate for the oscillation of the sheet or web of material 146 during the production of the decorative grass 142 having a compression-tension spring or pasta configuration. While the system 140 has been illustrated as having an oscillating assembly for oscillating the roll of material 144, and thus the sheet or web of material 146, it should be understood that the slitter and shredding unit 164 can also be oscillated, either alone or in combination with the oscillation of the sheet or web of material 146. Also, it should be understood that the oscillating curled sheet or web of material 158 can be maintained under tension while the oscillating curled sheet or web of material 158 is slit. Furthermore, the oscillating slit curled sheet or web of material 166 may be passed through a restraining assembly prior to cutting the slit curled sheet or web of material 166 so as to enhance uniformity of the curled decorative grass.

FIG. 14 illustrates schematically another system 170 for making a curled decorative grass 172 in accordance with the present invention. The system 170 includes a roll of material 174 which consists of a substantially flat sheet or web of material 176 capable of having a curl imparted thereto. The roll of material 174 is supported on a mandrel 178 having a brake assembly 180 operably connected thereto so that the sheet or web of material 176 can be controllably withdrawn from the roll of material 174. The sheet or web of material 176 withdrawn from the roll of material 174 is drawn over a curling edge 182 of a curl bar 184. The curling edge 182 of the curl bar 184 is oriented in the direction of travel of the sheet or web of material 176, i.e. in the machine direction.

To maintain the desired tension on the sheet or web of material 176 as the sheet or web of material 176 is drawn over the curling edge 182 of the curl bar 184, the system 170 further includes a guide roller 186 and a pair of tension or nip rollers 188 and 190 positioned downstream of the curl bar 184 to ensure proper angular disposition of the sheet or web of material 176 as the sheet or web of material 176 is drawn over the curling edge 182 of the curl bar 184 to provide a curled sheet or web of material 192. The curled sheet or web of material 192, upon passage around the guide roller 186 and through the tension rollers 188 and 190, is fed into a slitter or shredder 194 where the curled sheet or web of material 192 is slit to provide a slit sheet or web of material 196 having a plurality of curled strips of predetermined width.

The slitting of the curled sheet or web of material 192 to produce the slit sheet or web of material 196 having a plurality of curled strips of predetermined width can be accomplished using any well known method and device. Such common methods of slitting a sheet or web of material include slitting a sheet or web of material to produce side-by-side strips of material wherein the longer dimension of the strips is in the direction of travel of the sheet or web of material, i.e. the machine direction, or slitting a sheet or web of material so that the longer dimension of the strips of material are oblique to the direction of travel of the sheet or web of material, i.e. oblique to the machine direction.

The slit sheet or web of material 196 is then passed through a cutting unit 198 where the slit sheet or web of material 196 is cut to form curled decorative grass 172. Any conventional device and method can be employed to cut the slit sheet or web of material 196 to form the curled decorative grass 172 such as rotary knives, reciprocating knives, die cutting, laser cutting, water jet cutting, air jet cutting and the like.

Any material capable of having a curl imparted thereto can be employed as the sheet or web of material 176. However, desirable results can be achieved wherein the sheet or web of material 176 is paper, creped paper, polymeric film, laminated polymeric film, wax paper, paper having a shape sustaining agent applied to at least one side and paper having a lacquer applied to at least one side.

Further, the sheet or web of material 176 may have a printed pattern and/or an embossed pattern on at least one surface thereof, and the embossed pattern can be either in register or out of register with the printed pattern.

FIG. 15 illustrates schematically another system 200 for making a curled decorative grass 202 in accordance with the present invention. The system 200 includes a roll of material 204 which consists of a substantially flat sheet or web of material 206 capable of having a curl imparted thereto. The roll of material 204 is supported on a mandrel 208 having a brake assembly 210 operably connected thereto so that the sheet or web of material 206 can be controllably withdrawn from the roll of material 204. The sheet or web of material 206 withdrawn from the roll of material 204 is drawn over a curling edge 212 of a curl bar 214. The curling edge 212 of the curl bar 214 is oriented substantially perpendicular to the direction of travel of the sheet or web of material 206, i.e. substantially perpendicular to the machine direction.

To maintain the desired tension on the sheet or web of material 206 as the sheet or web of material 206 is drawn over the curling edge 212 of the curl bar 214, the system 200 further includes a guide roller 216 and a pair of tension or nip rollers 218 and 220 to ensure proper angular disposition of the sheet or web of material 206 as the sheet or web of material 206 is drawn over the curling edge 212 of the curl bar 214 to provide a curled sheet or web of material 222. The curled sheet or web of material 222, upon passage around the guide roller 216, over the curling edge 212 of the curl bar 214 and through the tension rollers 218 and 220, is fed into a slitter or shredder 224 where the curled sheet or web of material 222 is slit to provide a slit sheet or web of material 226 having a plurality of curled strips of predetermined width.

The slitting of the curled sheet or web of material 222 to produce the slit sheet or web of material 226 having a plurality of curled strips of predetermined width can be accomplished using any well known method and device. Such common methods of slitting a sheet or web of material include slitting a sheet or web of material to a to produces side-by-side strips of material wherein the longer dimension of the strips is in the direction of travel of the sheet or web of material, i.e. the machine direction, or slitting a sheet or web of material so that the longer dimension of the strips of material are oblique to the direction of travel of the sheet or web of material, i.e. oblique to the machine direction.

The slit sheet or web of material 226 is then passed through a cutting unit 228 where the slit sheet or web of material 226 is cut to form curled decorative grass 202. Any conventional device and method can be employed to cut the slit sheet or web of material 226 to form the curled decorative grass 202 such as rotary knives, reciprocating knives, die cutting, laser cutting, water jet cutting, air jet cutting and the like.

Any material capable of having a curl imparted thereto can be employed as the sheet or web of material 206. However, desirable results can be achieved wherein the sheet or web of material 206 is paper, creped paper, polymeric film, laminated polymeric film, wax paper, paper having a shape sustaining agent applied to at least one side and paper having a lacquer applied to at least one side. Further, the sheet or web of material 206 may have a printed pattern and/or an embossed pattern on at least one surface thereof, and the embossed pattern can be either in register or out of register with the printed pattern.

FIG. 16 illustrates schematically another system 230 for making a curled decorative grass 232 in accordance with the present invention. The system 230 includes a roll of material 234 which consists of a substantially flat sheet or web of material 236 capable of having a curl imparted thereto. The roll of material 234 is supported on a mandrel 238 having a brake assembly 240 operably connected thereto so that the sheet or web of material 236 can be controllably withdrawn from the roll of material 234. The sheet or web of material 236 withdrawn from the roll of material 234 is drawn over a curling edge 242 of a first curl bar 244 and over a curling edge 246 of a second curl bar 248. The curling edge 242 of the first curl bar 244 is oriented in the direction opposite the direction of travel of the sheet or web of material 236 and the curling edge 246 of the second curl bar 248 is oriented in the direction of travel of the sheet or web of material 236.

To maintain the desired tension on the sheet or web of material 236 as the sheet or web of material 236 is drawn over the curling edges 242 and 246 of the first and second curl bars 244 and 248, respectively, the system 230 further includes guide rollers 250 and 252 and a pair of tension or nip rollers 254 and 256. The guide roller 250 is positioned upstream from the first curl bar 244, and the guide roller 252 and the tension rollers 254 and 256 are positioned downstream of the second curl bar 248 to ensure proper angular disposition of the sheet or web of material 236 as the sheet or web of material 236 is drawn over the curling edges 242 and 246 of the first and second curl bars 244 and 248 to provide a curled sheet or web of material 258. The curled sheet or web of material 258, upon passage around the guide roller 252 and through the tension rollers 254 and 256, is fed into a slitter or shredder 260 where the curled sheet or web of material 258 is slit to provide a slit sheet or web of material 262 having a plurality of curled strips of predetermined width.

The slitting of the curled sheet or web of material 258 to produce the slit sheet or web of material 262 having a plurality of curled strips of predetermined width can be accomplished using any well known method and device. Such common methods of slitting a sheet or web of material include slitting a sheet or web of material to a to produces side-by-side strips of material wherein the longer dimension of the strips is in the direction of travel of the sheet or web of material, i.e. the machine direction, or slitting a sheet or web of material so that the longer dimension of the strips of material are obliquely to the direction of travel of the sheet or web of material, i.e. obliquely to the machine direction.

The slit sheet or web of material 262 is then passed through a cutting unit 264 where the slit sheet or web of material 262 is cut to form the curled decorative grass 232. Any conventional device and method can be employed to cut the slit sheet or web of material 262 to form the curled decorative grass 232 such as rotary knives, reciprocating knives, die cutting, laser cutting, water jet cutting, air jet cutting and the like.

Any material capable of having a curl imparted thereto can be employed as the sheet or web of material 236. However, desirable results can be achieved wherein the sheet or web of material 236 is paper, creped paper, polymeric film, laminated polymeric film, wax paper, paper having a shape sustaining agent applied to at least one side and paper having a lacquer applied to at least one side. Further, the sheet or web of material 236 may have a printed pattern and/or an embossed pattern on at least one surface thereof, and the embossed pattern can be either in register or out of register with the printed pattern.

It should be noted that when the web or sheet of material has a width corresponding to the desired length of the curled grass to be produced by the systems described hereinabove, the sheet or web of material can be cut either substantially perpendicular or obliquely to the direction of travel of the sheet or web of material which eliminates the need for slitting the sheet or web of material prior to cutting to form the curled decorative grass. Further, each of the before described systems 40, 71, 110, 140, 170, 200 and 230 can be modified in a similar manner to include application of a stiffening or shape-sustaining agent to the sheet or web of material, either before or after imparting a curl to the sheet or web of material, in the manner hereinbefore describe with reference to FIGS. 3 and 4.

FIG. 17 illustrates schematically yet another system 270 for making curled decorative grass 272 from a sheet or web of substantially flat material 274 capable of having a curl imparted thereto. The system 270 includes a roll of material (not shown) mounted on a mandrel having a brake assembly (also not shown) so that the sheet or web of material 274 can be controllably removed from the roll of material for passage through the system 270. The system 270 includes a pliable roller 276 rotatably mounted on a shaft 278, a non-pliable roller 280 rotatably mounted on a shaft 282, a motor 284 operably connected to the shaft 282 for rotatably driving the non-pliable roller 280 and a non-pliable back up roller 286 rotatably mounted on a shaft 288. The shafts 278, 282 and 288 of the pliable roller 276, the non-pliable roller 280 and the non-pliable back up roller 286 are substantially vertically aligned as shown. The non-pliable roller 280 is positioned adjacent the pliable roller 276 so that a depressed area 292 is formed in the pliable roller 276 by the non-pliable roller 280, whereby passage of the sheet or web of material 274 through the depressed area 292 formed in the pliable roller 276 by the non-pliable roller 280 provides a curled sheet or web of material 294. That is, upon actuation of the motor 284, the non-pliable roller 280 is rotated in a clockwise direction as indicated by the arrow 296 and rotation of the non-pliable roller 280 causes the pliable roller 276 to rotate in a counter clockwise direction as indicated by the arrow 298. As the sheet or web of material 274 is advanced through the depressed area 292 and between the pliable roller 276 and the non-pliable roller 280, the curled sheet or web of material 294 is formed by imparting a curl to the sheet or web of material 274.

The diameter of the non-pliable roller 280 can vary widely and will depend upon the tightness of the curl to be imparted to the sheet or web of material 274. For example, the smaller the diameter of the non-pliable roller 280, the tighter the curl formed in the curled sheet or web of material 294.

The system 270 further includes a pair of tension or nip rollers 300 and 302, a slitter or shredder 304 where the curled sheet or web of material 294 is slit to provide a slit sheet or web of material 306 having a plurality of curled strips of predetermined width, and a cutting unit 308 where the curled strips of the slit sheet or web of material 306 are cut to form the curled decorative grass 272. The nip or tension rollers 300 and 302 are positioned downstream of the pliable roller 276 and the non-pliable roller 280 to ensure proper tension is maintained on the sheet or web of material 274 as same is drawn through the depressed area 292 formed in the pliable roller 276 by the non-pliable roller 280 to provided the curled sheet or web of material 294.

The curled sheet or web of material 294, after passage through the nip or tension rollers 300 and 302, is fed into the slitter or shredder 304 where the curled sheet or web of material 294 is slit to provide the slit sheet or web of material 306 having a plurality of curled strips of predetermined width. The slit sheet or web of material 306 is then fed through the cutting unit 308 where the curled strips of the slit sheet or web of material 306 are cut to form the curled decorative grass 272.

The slitting of the curled sheet or web of material 294 to produce the slit sheet or web of material 306 can be accomplished using any well known method and device. Such common methods of slitting the curled sheet or web of material 294 include slitting the curled sheet or web of material 294 to produce side-by-side strips of material wherein the longer dimension of the strips is in the direction of travel of the sheet or web of material, i.e., the machine direction, or slitting the curled sheet or web of material 294 so that the longer dimension of the strips of material are oblique to the direction of travel of the curled sheet or web of material 294, i.e., oblique to the machine direction.

The cutting of the curled slit sheet or web of material 306 to form the curled decorative grass 272 can also be accomplished using any well known method and device. Examples of such conventional devices which can be used as the cutting unit 308 and methods which can be employed to cut the curled slit sheet or web of material 306 to form curled decorative grass 272 are rotary knives, reciprocating knives, die cutting, laser cutting, water jet cutting, air jet cutting and the like.

To enhance the uniformity of the curled decorative grass 272 produced utilizing the system 270, it may be desirable to pass the slit sheet or web of curled material 306 through a restraining assembly 310 disposed between the slitter 304 and the cutting unit 308 so as to maintain the slit sheet or web of curled material 306 in a substantially planar or flattened condition prior to introduction of the slit sheet or web of curled material 306 into the cutting unit 308. Any suitable apparatus can be employed as the restraining assembly 310, such as a plurality of spatially disposed guide wires 312 which extend between the slitter 304 and the cutting unit 308 so as to provide a passageway 314 through which the slit sheet or web of material 306 is drawn or fed through prior to passage through the cutting unit 308.

Any material capable of having a curl imparted thereto can be employed as the sheet or web of material 274. However, desirable results can be achieved wherein the sheet or web of material 274 is paper, creped paper, polymeric film, laminated polymeric film, wax paper, paper having a shape sustaining agent applied to at least one side and paper having a lacquer applied to at least one side. Further, the sheet or web of material 274 may have a printed pattern and/or an embossed pattern on at least one surface thereof, and the embossed pattern can be either in register or out of register with the printed pattern.

FIG. 18 illustrates schematically a system 320 for imparting a curl to a sheet or web of substantially flat material 322 and thereby provide a curled sheet or web of material 324 which can be cut into curled strips of material to provide decorative grass. The sheet or web of material 322 is generally removed from a roll of material (not shown) mounted on a mandrel having a brake assembly (also not shown) so that the sheet or web of material 322 can be controllably removed from the roll of material for passage through the system 320.

The system 320 includes a pliable endless belt or conveyor 326, a curl bar 328 having a curling edge 330 and a pair of nip or tension rollers 332 and 334 for maintaining proper tension on the sheet or web of material 322 as the sheet or web of material 322 is drawn past the curling edge 330 of the curling bar 328 to form the curled sheet or web of material 324. The curl bar 328 is positioned adjacent the pliable endless belt 326 so that a depressed area 336 is formed in the pliable endless belt 326 by the curling edge 330 of the curl bar 328 substantially as shown, whereby passage of the sheet or web of material 322 through the depressed area 336 formed in the pliable endless belt 326 and around the curling edge 330 of the curl bar 328 imparts a curl to the sheet or web of material 322 which results in the formation of the curled sheet or web of material 324. The curled sheet or web of material 324 can then be slit and cut to provide a curled decorative grass in the manner hereinbefore described.

Any material capable of having a curl imparted thereto can be employed as the sheet or web of material 322. However, desirable results can be achieved wherein the sheet or web of material 322 is paper, creped paper, polymeric film, laminated polymeric film, and paper having a lacquer applied to at least one side. Further, the sheet or web of material 322 may have a printed pattern and/or an embossed pattern on at least one surface thereof, and the embossed pattern can be either in register or out of register with the printed pattern.

FIG. 19 illustrates schematically another system 340 for making a curled decorative grass 341 in accordance with the present invention. The system 340 includes a first mandrel 342 rotatably supported by a frame 344, a drive assembly 346 for rotating the first mandrel 342 and a roll of material 348 which consists of a substantially flat web of material 350 capable of having a curl imparted thereto. The roll of material 348 is supported on a second mandrel 352 having a brake assembly 354 operably connected thereto so that the web of material 350 can be controllably withdrawn from the roll of material 348 and wrapped about the first mandrel 342 as the first mandrel 342 is rotated in response to actuation of the drive assembly 346 and as a curled web of material 355 is removed from the first mandrel 342 and cut to produce the curled decorative grass 341. The second mandrel 352 is supported on a roll support assembly 356 so that the roll of material 348, and thus the web of material 350 withdrawn therefrom, are angularly disposed relative to the first mandrel 342 rotatably supported by a frame 344 in the direction of a distal end 358 of the first mandrel 342 substantially as shown.

Any material capable of having a curl imparted thereto by wrapping about the first mandrel 342 can be employed as the web of material 350. However, desirable results can be achieved wherein the web of material 350 is paper, creped paper, polymeric film, laminated polymeric film, wax paper, paper having a shape sustaining agent applied to at least one side and paper having a lacquer applied to at least one side. Further, the web of material 350 may have a printed pattern and/or an embossed pattern on at least one surface thereof, and the embossed pattern can be either in register or out of register with the printed pattern.

The first mandrel 342 and the drive assembly 346 can be connected to the frame 344 in a conventional manner provided the first mandrel 342 is freely rotatable in response to actuation of the drive assembly 346. For example, the frame 344 can be provided with a first opening 360 for rotatably mounting the first mandrel 342 and a spatially disposed second opening 362 through which a drive shaft 364 of the drive assembly 346 extends. The first mandrel 342 is bearingly mounted in the first opening 360 by a bushing 366 and collars 368 and 370; and the drive shaft 364 of the drive assembly 346 is bearingly mounted in the second opening 362 by ambushing 372 and collars 374 and 376.

The drive assembly 346 further includes a motor 378 operably connected to the drive shaft 364, a drive gear 380 and a driven gear 382. The drive gear 380 is mounted on or near a distal end 384 of the drive shaft 364 so as to be aligned with the driven gear 382 which is mounted on the first mandrel 342 such that, upon actuation of the motor 378, rotational movement is imparted to the first mandrel 342 in response to rotational movement of the drive shaft 364, the drive gear 380 and the driven gear 382.

The speed of rotation of the first mandrel 342 can be varied by varying the gear ratio of the drive gear 380 and the driven gear 382. Desirably, the gear ratio selected will be such that, as the web of material 350 is withdrawn from the roll of material 348, the web of material 350 will be wound about the first mandrel 342 at substantially the same rate that the curled web of material 355 is removed from the first mandrel 342. Further, the tightness of the curl imparted to the web of material 350 will depend to a large degree on the diameter of the first mandrel 342 and the curling properties of the web of material 350.

It should be understood that while the drive assembly 346 has been described as having a drive gear 380 and a driven gear 382, other components could readily be used in place of the drive gear 380 and the driven gear 382, such as a plurality of pulleys which are interconnected by an appropriate number of belts.

The system 340 further includes a spray assembly 388 for spraying a stiffening or shape sustaining agent onto the web of material 350 wound about the first mandrel 342, a dryer 390 disposed downstream of the spray assembly 388, and a cutting unit 392 for cutting the curled web of material 355 to form the decorative grass 341. To enhance substantially uniform removal of the curled web of material 355 from the first mandrel 342, while at the same time providing a substantially constant supply of the curled web of material 355 to the cutting unit 392, the system 340 is also provided with a pair of nip or tension rollers 394 and 396.

The spray assembly 388 includes a spray nozzle 398 connected to a source (not shown) of a liquid composition containing a stiffening or shape sustaining agent via a conduit 400. Any liquid composition which is compatible with the web of material 350 and which is capable of retaining the desired curl in the curled web of material 355 can be employed. Examples of liquid compositions containing a stiffening or shape sustaining agent which may be used in the practice of the present invention are aqueous starch solutions, aqueous sugar solutions, lacquers, glues and mixtures thereof and liquid, sprayable admixtures containing water-proofing agents such as silicon-based polymers, latex-based polymers, acrylic polymers, fluorocarbons and mixtures thereof.

While the dryer 390 disposed downstream of the spray assembly 388 is illustrated as a tube dryer through which a portion of the first mandrel extends, it should be understood that any dryer can be employed in the practice of the present invention provided the dryer is capable of drying the web of material 350 wrapped about the first mandrel 342 and sprayed with a liquid composition containing a stiffening or shape sustaining agent prior to removal of the curled web of material 355 from the first mandrel 342.

The cutting unit 392 cuts the curled web of material 355 into strips or segments (which constitute the curled decorative grass 341) wherein the longer dimension of the strips or segments is in the direction substantially perpendicular to the direction of travel of the curled web of material 355. Further, to enhance uniformity of the strips or segments, the cutting unit is positioned such that the cutting elements are angularly disposed so as to be substantially parallel to the angular disposition of the web of material 350.

Any well known cutting device can be used as the cutting unit 392 for cutting the curled web of material 355 into strips or segments. Examples of such devices which can be used as the cutting unit 392 and methods which can be employed to cut the curled web of material 355 to form the curled decorative grass 341 are rotary knives, reciprocating knives, die cutting, laser cutting, water jet cutting, air jet cutting and the like.

FIG. 20 illustrates schematically another system 410 for making a pre-curled web of material 412 (FIG. 21) which can be cut to form curled decorative grass in accordance with the present invention. To form the pre-curled web of material 412, an effective amount of a stiffening or shape sustaining agent is applied to at least one surface of a sheet or web of material to moisten the sheet or web of material and thereby provide a moistened sheet or web of material 414. The moistened sheet or web of material 414 is then wrapped about a mandrel 416 having a preselected diameter and the moistened sheet or web of material 414 is then dried while wrapped about the mandrel 416 to form the pre-curled web of material 412. Thereafter, the pre-curled web of material 412 is removed from the mandrel 416 and cut into segments to provide a decorative grass.

Any material capable of having a curl imparted thereto and which can be moistened with a stiffening or shape sustaining agent can be employed as the sheet of web or material in the formation of the pre-curled web of material 412. The material may have a printed pattern and/or an embossed pattern on at least one surface thereof, and the embossed pattern can be either in register or out of register with the printed pattern. Examples of such materials are paper, creped paper, polymeric film, laminated polymeric film, wax paper and the like.

The stiffening or shape sustaining agent applied to the sheet or web of material to moisten the sheet or web of material and thereby provide a moistened sheet or web of material 414 can be any composition which is compatible with the sheet or web of material and which is capable of retaining the desired curl in the pre-curled web of material 412 can be employed. Examples of stiffening or shape sustaining agent which may be used in the practice of the present invention are aqueous starch solutions, aqueous sugar solutions, lacquers, glues and mixtures thereof and liquid, admixtures containing water-proofing agents such as silicon-based polymers, latex-based polymers, acrylic polymers, fluorocarbons and mixtures thereof.

The pre-curled material 412 can be formed manually by hand wrapping a sheet or web of material about the mandrel 416, or the pre-curled web of material can be formed automatically using a system similar to the system 340 hereinbefore described with reference to FIG. 19. The tightness of the curl imparted to the pre-curled web of material 412 will depend to a large degree on the diameter of the mandrel 416 and the curling properties of the sheet or web of material 414 moistened with the stiffening or shape sustaining agent.

The pre-curled web of material 412 can be cut into strips or segments wherein the longer dimension of the strips or segments is in the direction substantially perpendicular to an elongated axis of the pre-curled web of material 412. Further, any well known cutting device can be used to cut the pre-curled web of material into strips or segments. Cutting devices which can be used to cut the pre-curled web of material 412 into strips or segments include rotary knives, reciprocating knives, die cutting, laser cutting, water jet cutting, air jet cutting and the like.

FIG. 22 illustrates schematically another system 420 for making curled decorative grass 422 from a pre-curled web of material 424. The pre-curled web of material 424 can be made of paper, creped paper, polymeric film, laminated polymeric film, wax paper and the like. Further, the pre-curled web of material 424 may have a printed pattern and/or an embossed pattern, and the embossed pattern can be either in register or out of register with the printed pattern.

The system 420 for making curled decorative grass 422 from the pre-curled web of material 424 includes a first pair of nip or tension rollers 426 and 428, a spray assembly 429, a curl bar 430 having a curling edge 432, a second pair of nip or tension rollers 434 and 436, a dryer 437 and a slitter or shredder 438. In producing the curled decorative grass 422 from the pre-curled web of material 424, the pre-curled web of material 424 is passed through the first pair of tension roller 426 and 428 whereupon the spray assembly 429 applies an effective amount of a stiffening or shape sustaining agent to the pre-curled web of material 424 to provide a moistened pre-curled web of material 440. The moistened pre-curled web of material 440 is then drawn over the curling edge 432 of the curl bar 430 so as to provide a modified pre-curled web of material 442, and the modified pre-curled web of material 442 is then passed through the second pair of tension rollers 434 and 436 and the dryer 437 to provide a substantially dry, modified pre-curled web of material 444. The dried modified pre-curled web of material 444 is then fed into the slitter or shredder 438 wherein the dried modified pre-curled web of material 444 is cut into segments or strips which constitute the curled decorative grass 422.

The first pair of tension rollers 426 and 428 cooperate with the second pair of tension rollers 434 and 436 to maintain the desired tension on the moistened pre-curled web of material 440 as the moistened pre-curled web of material 440 is drawn over the curling edge 432 of the curl bar 430. The curling edge 432 of the curl bar 430 is angularly disposed relative to the travel path of the moistened pre-curled web of material 440 so that as the moistened pre-curled web of material 440 is drawn over the curling edge 432 of the curl bar 430 additional curl is imparted thereto.

The angular disposition of the curling edge 432 of the curl bar 430 relative to the moistened pre-curled web of material 440 can vary widely and will be dependent to a large degree on the amount and type of additional curl to be imparted to the moistened pre-curled web of material 440, as well as to the curling properties of the moistened pre-curled web of material 440. Generally, however, the curling edge 432 of the curl bar 430 will be disposed at an angle of from about 15 degrees to about 180 degrees relative to the moistened pre-curled web of material 440.

Any liquid composition containing a stiffening or shape sustaining agent which is compatible with the pre-curled web of material 424 and which is capable of wetting the pre-curled web of material 424 can be employed to moisten the pre-curled web of material 424 to provide a moistened pre-curled web of material 440. Examples of liquid compositions containing a stiffening or shape sustaining agent which may be used in the practice of the present invention are aqueous starch solutions, aqueous sugar solutions, lacquers, glues and mixtures thereof and liquid, sprayable admixtures containing waterproofing agents such as silicon-based polymers, latex-based polymers, acrylic polymers, fluorocarbons and mixtures thereof.

The slitter or shredder 438 cuts the modified pre-curled web of material 444 into segments or strips (i.e the decorative grass 422) wherein the longer dimension of the strips or segments is in the direction oblique to the direction of travel of the dried modified pre-curled web of material 444. Any well known cutting device can be used as the slitter or shredder 438. Examples of such devices which can be used as the slitter or shredder 438 and methods which can be employed to cut the dried modified pre-curled web of material 444 to form the curled decorative grass 422 are rotary knives, reciprocating knives, die cutting, laser cutting, water jet cutting, air jet cutting and the like.

FIG. 23 illustrates schematically another system 450 for making curled decorative grass 452 from a pre-curled web of material 454. The pre-curled web of material 454 can be made of paper, creped paper, polymeric film, laminated polymeric film, wax paper and the like. Further, the pre-curled web of material 454 may have a printed pattern and/or an embossed pattern, and the embossed pattern can be either in register or out of register with the printed pattern.

The system 450 for making curled decorative grass 452 from the pre-curled web of material 454 includes a first pair of nip or tension rollers 456 and 458, a curl bar 460 having a curling edge 462, a second pair of nip or tension rollers 464 and 466, a spray assembly 468, a dryer 470 and a slitter or shredder 472. In producing the curled decorative grass 452 from the pre-curled web of material 454, the pre-curled web of material 454 is passed through the first pair of tension rollers 456 and 458 and drawn over the curling edge 462 of the curl bar 460 so as to provide a modified pre-curled web of material 474. The modified pre-curled web of material 474 is then passed through the second pair of tension rollers 464 and 466 whereupon the spray assembly 468 applies an effective amount of a stiffening or shape sustaining agent to the modified pre-curled web of material 474 to provide a moistened, modified pre-curled web of material 476. The moistened, modified pre-curled web of material 476 is then passed through the dryer 470 to provide a substantially dry treated modified pre-curled material 478 which is then passed into the slitter or shredder 472 wherein the dry treated modified pre-curled web of material 478 is cut into segments or strips which constitute the curled decorative grass 452.

The first pair of tension rollers 456 and 458 cooperate with the second pair of tension rollers 464 and 466 to maintain the desired tension on the pre-curled web of material 454 as the pre-curled web of material 454 is drawn over the curling edge 462 of the curl bar 460. The curling edge 462 of the curl bar 460 is angularly disposed relative to the travel path of the pre-curled web of material 454 so that as the pre-curled web of material 454 is drawn over the curling edge 462 of the curl bar 460 additional curl is imparted thereto.

The angular disposition of the curling edge 462 of the curl bar 460 relative to the pre-curled web of material 454 can vary widely and will be dependent to a large degree on the amount and type of additional curl to be imparted to the pre-curled web of material 454, as well as to the curling properties of the pre-curled web of material 454. Generally, however, the curling edge 462 of the curl bar 460 will be disposed at an angle of from about 15 degrees to about 180 degrees relative to the pre-curled web of material 454.

Any liquid composition containing a stiffening or shape sustaining agent which is compatible with the pre-curled web of material 454 and which is capable of wetting the pre-curled web of material 454 can be employed to moisten the modified pre-curled web of material 474 to provide the moistened, modified pre-curled web of material 476. Examples of liquid compositions containing a stiffening or shape sustaining agent which may be used in the practice of the present invention are aqueous starch solutions, aqueous sugar solutions, lacquers, glues and mixtures thereof and liquid, sprayable admixtures containing water-proofing agents such as silicon-based polymers, latex-based polymers, acrylic polymers, fluorocarbons and mixtures thereof.

Any conventional dryer can be employed as the dryer 470 to dry the moistened, modified pre-curled web of material 476. Since such dryers are well known and commercially available, no further comments or description of the dryer 470 is believed necessary to enable one skilled in the art to practice the inventive concept disclosed herein.

The slitter or shredder 472 cuts the treated, modified pre-curled web of material 474 into segments or strips (i.e the decorative grass 452) wherein the longer dimension of the strips or segments is in the direction oblique to the direction of travel of the treated, modified pre-curled web of material 474. Any well known cutting device can be used as the slitter or shredder 472. Examples of such devices which can be used as the slitter or shredder 472 and methods which can be employed to cut the treated, modified pre-curled web of material 474 to form the curled decorative grass 452 are rotary knives, reciprocating knives, die cutting, laser cutting, water jet cutting, air jet cutting and the like.

FIG. 24 illustrates schematically still another system 480 for making curled decorative grass 482 from a pre-curled web of material 484. The pre-curled web of material 484 can be made of paper, creped paper, polymeric film, laminated polymeric film, wax paper and the like. Further, the pre-curled web of material 484 may have a printed pattern and/or an embossed pattern, and the embossed pattern can be either in register or out of register with the printed pattern.

The system 480 for making curled decorative grass 482 from the pre-curled web of material 484 includes a spray assembly 486 for applying an effective amount of a stiffening or shape sustaining agent to the pre-curled web of material 484 to provide a moistened pre-curled web of material 488 and a dryer 490 for drying the moistened pre-curled web of material 488 to produce a treated pre-curled web of material 492. Any liquid composition containing a stiffening or shape sustaining agent which is compatible with the pre-curled web of material 484 and which is capable of wetting the pre-curled web of material 484 can be sprayed onto the pre-curled web of material 484 by the spray assembly 486 to produce the moistened pre-curled web of material 488. Examples of liquid compositions containing a stiffening or shape sustaining agent which may be used in the practice of the present invention are aqueous starch solutions, aqueous sugar solutions, lacquers, glues and mixtures thereof and liquid, sprayable admixtures containing water-proofing agents such as silicon-based polymers, latex-based polymers, acrylic polymers, fluorocarbons and mixtures thereof.

Any conventional dryer can be employed as the dryer 490 to dry the moistened pre-curled web of material 488. Since such dryers are well known and commercially available, no further comments or description of the dryer 490 is believed necessary to enable one skilled in the art to practice the inventive concept disclosed herein.

The system 480 further includes a first pair of nip or tension rollers 494 and 496, a curl bar 498 having a curling edge 500, a second pair of nip or tension rollers 502 and 504 and a slitter or shredder 506. In producing the curled decorative grass 482 from the treated pre-curled web of material 492, the treated pre-curled web of material 492 is passed through the first pair of tension roller 494 and 496 and drawn over the curling edge 500 of the curl bar 498 to further curl the treated pre-curled web of material 492 and provide a modified pre-curled web of material 508. The modified pre-curled web of material 508 is then passed through the second pair of tension rollers 502 and 504 and into the slitter or shredder 506 wherein the modified pre-curled web of material 508 is cut into segments or strips which constitute the curled decorative grass 482.

The first pair of tension rollers 494 and 496 cooperate with the second pair of tension rollers 502 and 504 to maintain the desired tension on the treated pre-curled web of material 492 as the treated pre-curled web of material 492 is drawn over the curling edge 500 of the curl bar 498. The curling edge 500 of the curl bar 498 is angularly disposed relative to the travel path of the treated pre-curled web of material 492 so that as the treated pre-curled web of material 492 is drawn over the curling edge 500 of the curl bar 498 additional curl is imparted to the treated pre-curled web of material 492.

The angular disposition of the curling edge 500 of the curl bar 498 relative to the treated pre-curled web of material 492 can vary widely and will be dependent to a large degree on the amount and type of additional curl to be imparted to the treated pre-curled web of material 492, as well as to the curling properties of the treated pre-curled web of material 492. Generally, however, the curling edge 500 of the curl bar 498 will be disposed at an angle of from about 15 degrees to about 180 degrees relative to the treated pre-curled web of material 492.

The slitter or shredder 506 cuts the modified pre-curled web of material 508 into segments or strips (i.e the curled decorative grass 482) wherein the longer dimension of the strips or segments is in the direction substantially perpendicular or oblique to the direction of travel of the modified pre-curled web of material 480. Any well known cutting device can be used as the slitter or shredder 506. Examples of such devices which can be used as the slitter or shredder 506 and methods which can be employed to cut the modified pre-curled web of material 508 to form the curled decorative grass 482 are rotary knives, reciprocating knives, die cutting, laser cutting, water jet cutting, air jet cutting and the like.

Figure 25:
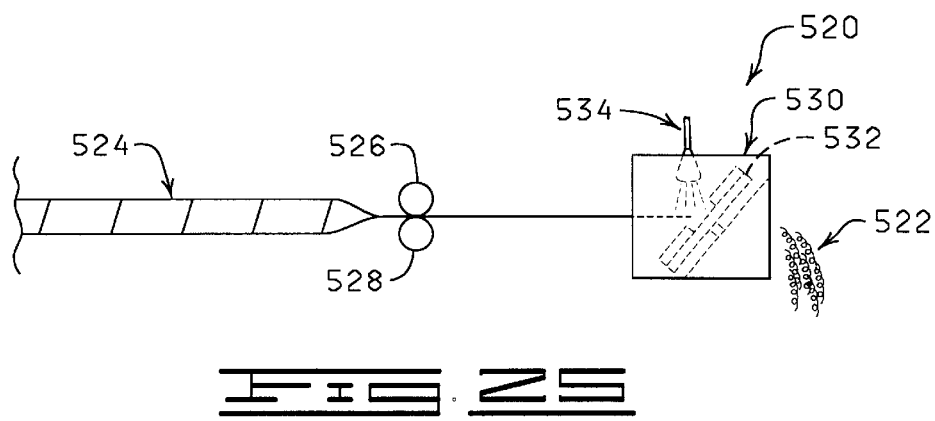
FIG. 25 is a schematic representation of still another system for making curled decorative grass utilizing a pre-curled material.

FIG. 25 illustrates schematically another system 520 for making curled decorative grass 522 from a pre-curled web of material 524. The pre-curled web of material 524 can be made of paper, creped paper, polymeric film, laminated polymeric film, wax paper and the like. Further, the pre-curled web of material 524 may have a printed pattern and/or an embossed pattern, and the embossed pattern can be either in register or out of register with the printed pattern.

The system 520 for making curled decorative grass 522 from the pre-curled web of material 524 includes a pair of nip or tension rollers 526 and 528 and a slitter or shredder 530. The slitter or shredder 530 is provided with a blade 532 and a spray assembly 534 for spraying a stiffening or shape sustaining agent on the blade 532 during cutting of the pre-curled web of material 524 into strips or segments. In producing the curled decorative grass 522 from the pre-curled web of material 524, the pre-curled web of material 524 is passed through the tension rollers 526 and 528 and into the slitter or shredder 530 wherein the blade 532 cuts the pre-curled web of material 524 into segments or strips which constitute the curled decorative grass 522. During the cutting of the pre-curled web of material 524, the blade is sprayed with a stiffening or shape-sustaining agent.

Any liquid composition containing a stiffening or shape sustaining agent which is compatible with the pre-curled web of material 524 can be sprayed onto the blade 532 of the slitter or shredder 530 during the cutting or shredding of the pre-curled web of material 524. Examples of liquid compositions containing a stiffening or shape sustaining agent which may be used in the practice of the present invention are aqueous starch solutions, aqueous sugar solutions, lacquers, glues and mixtures thereof and liquid, sprayable admixtures containing water-proofing agents such as silicon-based polymers, latex-based polymers, acrylic polymers, fluorocarbons and mixtures thereof.

Each of the systems described herein produce a curled decorative grass, the configuration of which will be determined by the particular system employed. Changes may be made in the construction and operation of the various parts, elements and assemblies described herein and the steps or the sequence of steps of the methods described herein without departing from the spirit and the scope of the invention as defined in the following claims.

What is claimed is:

1. A method for making curled decorative grass for use as a packing material, an animal bedding, cat litter, mulch for soil and as a media for plants, the curled decorative grass produced from a substantially flat sheet of material wherein the curled decorative grass has a multi-sided cross section, a length and a width, and wherein the method comprises the steps of:

providing a substantially flat sheet of material capable of having a curl imparted thereto;

drawing the substantially flat sheet of material over at least one curl bar so as to produce a curled sheet of material, the substantially flat sheet of material being maintained under tension while drawn over the at least one curl bar to ensure proper angular disposition of the substantially flat sheet of material over the at least one curl bar;

slitting the curled sheet of material to provide a slit curled sheet of material containing a plurality of curled, side-by-side strips of material wherein each of the plurality of curled, side-by-side strips of material has a predetermined width; and cutting the slit curled sheet of material to provide curled decorative grass having a substantially clock spring configuration.

2. The method for making curled decorative grass of claim 1 wherein, in the step of slitting the curled sheet of material, the curled sheet of material is maintained under tension while slitting the curled sheet of material.

3. The method for making curled decorative grass of claim 1 further comprising the step of:

passing the slit curled sheet of material through a restraining assembly prior to cutting the slit curled sheet of material so as to maintain the slit curled sheet of material in a substantially planar or flattened condition, thereby enhancing uniformity of the curled decorative grass.

4. The method for making curled decorative grass of claim 1 wherein, in the step of drawing the substantially flat sheet of material over at least one curl bar, the at least one curl bar is provided with a curling edge over which the sheet of material is drawn to form the curled sheet of material and wherein the curling edge of the at least one curl bar is disposed at an angle of from about 15 degrees to about 180 degrees relative to the substantially flat sheet of material.

5. The method for making curled decorative grass of claim 1 wherein, in the step of drawing the substantially flat sheet of material over at least one curl bar, the substantially flat sheet of material is drawn over a plurality of spatially disposed curl bars to form the curled sheet of material.

6. The method for making curled decorative grass of claim 5 wherein each of the curl bars is provided with a curling edge over which the substantially flat sheet of material is drawn so as to impart the curl to the substantially flat sheet of material and form the curled sheet of material, and wherein the curling edge of each of the curl bars is disposed at an angle of from about 15 degrees to about 180 degrees relative to the substantially flat sheet of material.

7. The method for making curled decorative grass of claim 1 wherein, in the step of providing a substantially flat sheet of material, the substantially flat sheet of material is selected from the group consisting of paper, polymeric film, laminated polymeric film, wax paper, paper having a shape-sustaining agent applied to at least one side thereof and paper having a lacquer applied to at least one side thereof.

8. The method for making curled decorative grass of claim 1 wherein, in the step of providing a substantially flat sheet of material, the substantially flat sheet of material is provided with a printed pattern on at least a portion of one surface thereof such that at least a substantial portion of the curled decorative grass formed therefrom contains at least a portion of the printed pattern.

9. The method for making curled decorative grass of claim 1 wherein, in the step of providing a substantially flat sheet of material, the substantially flat sheet of material is provided with an embossed pattern on at least a portion of one surface thereof such that at least a substantial portion of the curled decorative grass formed therefrom contains at least a portion of the embossed pattern.

10. The method for making curled decorative grass of claim 1 wherein, in the step of providing a substantially flat sheet of material, the substantially flat sheet of material is provided with a printed pattern on at least a portion of one surface thereof and an embossed pattern on at least a portion of one surface thereof such that at least a substantial portion of the curled decorative grass formed therefrom contains at least a portion of the printed pattern and at least a portion of the embossed pattern.

11. The method for making curled decorative grass of claim 10 wherein the printed pattern and the embossed pattern are in register with one another.

12. The method for making curled decorative grass of claim 10 wherein the printed pattern and the embossed pattern are out of register with one another.

13. A method for making curled decorative grass for use as a packing material, an animal bedding, cat litter, mulch for soil and as a media for plants, the curled decorative grass produced from a substantially flat sheet of material wherein the curled decorative-grass has a multi-sided cross section, a length and a width, and wherein the method comprises the steps of:

providing a substantially flat sheet of material capable of having a curl imparted thereto;

drawing the substantially flat sheet of material over at least one curl bar so as to form a curled sheet of material, the substantially flat sheet of material being maintained under tension while drawn over the at least one curl bar to ensure proper angular disposition of the substantially flat sheet of material over the at least one curl bar;

oscillating the curled sheet of material in a lateral direction relative to the direction of travel of the curled sheet of material;

slitting the oscillating curled sheet of material to provide a slit curled sheet of material containing a plurality of curled, side-by-side strips of material wherein each of the plurality of curled, side-by-side strips of material has a predetermined width; and cutting the slit curled sheet of material to provide curled decorative grass having a substantially compression-tension spring configuration.

14. The method for making curled decorative grass of claim 13 wherein, in the step of slitting the curled sheet of material, the curled sheet of material is maintained under tension while slitting the curled sheet of material.

15. The method for making curled decorative grass of claim 14 further comprising:

passing the oscillating slit curled sheet of material through a restraining assembly prior to cutting the slit curled sheet of material so as to maintain the slit curled sheet of material in a substantially planar or flattened condition, thereby enhancing uniformity of the curled decorative grass.

16. The method for making curled decorative grass of claim 13 wherein, in the step of providing a substantially flat sheet of material, the substantially flat sheet of material is selected from the group consisting of paper, polymeric film, laminated polymeric film, wax paper, paper having a shape-sustaining agent applied to at least one side thereof and paper having a lacquer applied to at least one side thereof.

* * * * *